US 7,515,746 B2

(12) United States Patent
Pettitt

(10) Patent No.: US 7,515,746 B2
(45) Date of Patent: Apr. 7, 2009

(54) AUTOMATED COLOR MATCHING FOR TILED PROJECTION SYSTEM

(75) Inventor: Gregory S. Pettitt, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 398 days.

(21) Appl. No.: 09/945,295

(22) Filed: Aug. 31, 2001

(65) Prior Publication Data

US 2002/0041708 A1    Apr. 11, 2002

Related U.S. Application Data

(60) Provisional application No. 60/229,625, filed on Aug. 31, 2000.

(51) Int. Cl.
*G06K 9/00* (2006.01)
*G09G 5/00* (2006.01)
*G09G 5/02* (2006.01)
*G03F 3/08* (2006.01)
*H04N 5/66* (2006.01)
*H04N 9/12* (2006.01)

(52) U.S. Cl. ............... 382/167; 345/1.3; 345/590; 348/383; 358/520

(58) Field of Classification Search ............ 382/162, 382/167; 345/1.1, 1.3, 589, 590; 348/383; 358/518, 519, 520
See application file for complete search history.

(56) References Cited

U.S. PATENT DOCUMENTS

| 5,079,544 | A | * | 1/1992 | DeMond et al. ............... 345/84 |
| 5,253,043 | A | * | 10/1993 | Gibson ........................ 348/708 |
| 5,287,173 | A | * | 2/1994 | Onuma et al. ............... 348/655 |
| 5,337,410 | A | * | 8/1994 | Appel ......................... 345/501 |
| 5,412,186 | A | * | 5/1995 | Gale ........................... 219/679 |
| 5,512,961 | A | * | 4/1996 | Cappels, Sr. ................ 348/658 |
| 5,612,753 | A | * | 3/1997 | Poradish et al. ............. 348/743 |
| 5,917,939 | A | * | 6/1999 | Ohta et al. .................. 382/167 |
| 5,921,650 | A | * | 7/1999 | Doany et al. .................. 353/31 |

(Continued)

FOREIGN PATENT DOCUMENTS

EP    774871    A2 *    5/1997

(Continued)

OTHER PUBLICATIONS

Hereld et al: "Introduction to Building Projection-Based Tiled Display Systems", Proceedings of the Fourth International Immersive Projection Technology Workshop, Jun. 2000, pp. 3-4, XP002341491, 2000 IEEE, pp. 22-28.

*Primary Examiner*—Yubin Hung
(74) *Attorney, Agent, or Firm*—Charles A. Brill; Wade James Brady, III; Frederick J. Telecky, Jr.

(57) ABSTRACT

A method of color-matching the images generated by multiple projectors (11) of a tiled projection systems. Each projector (11) has its own processing unit (34), and stores color and luminance data associated with that projector (11). A main controller (13) in data communication with each projector (11) receives the color and luminance data and, for each projector, calculates color correction data for that projector. The main controller (13) delivers the correction data to each processor (11), which then uses the correction data to adjust the values of its pixel data.

12 Claims, 4 Drawing Sheets

U.S. PATENT DOCUMENTS

| | | | |
|---|---|---|---|
| 5,986,721 A * | 11/1999 | Jones et al. | 348/743 |
| 6,054,832 A * | 4/2000 | Kunzman et al. | 318/600 |
| 6,101,272 A * | 8/2000 | Noguchi | 382/167 |
| 6,340,976 B1 * | 1/2002 | Oguchi et al. | 345/690 |
| 6,388,674 B1 * | 5/2002 | Ito et al. | 345/590 |
| 6,453,067 B1 * | 9/2002 | Morgan et al. | 382/162 |
| 6,467,910 B1 * | 10/2002 | Sato | 353/84 |
| 6,519,049 B1 * | 2/2003 | Nagasaka | 358/1.15 |
| 6,559,826 B1 * | 5/2003 | Mendelson et al. | 345/102 |
| 6,563,944 B1 * | 5/2003 | Kumada | 382/162 |
| 7,034,842 B1 * | 4/2006 | Sato et al. | 345/589 |

FOREIGN PATENT DOCUMENTS

| | | |
|---|---|---|
| EP | 0 989 757 A1 | 3/2000 |
| EP | 1 039 749 A1 | 9/2000 |
| JP | 02001351 A * | 1/1990 |
| WO | WO 97/36281 A1 | 10/1997 |
| WO | WO 99/31877 A1 | 6/1999 |

* cited by examiner

AUTOMATED COLOR MATCHING FOR TILED PROJECTION SYSTEM

This application claims priority under 35 USC § 119(e)(1) of provisional application No. 60/229,625 filed Aug. 31, 2000.

TECHNICAL FIELD OF THE INVENTION

This invention relates to projection display systems, and more particularly to display systems that use multiple projectors to generate a tiled display and to a subsystem and method for matching the colors generated by each projector.

BACKGROUND OF THE INVENTION

A tiled display is used when a large display is desired. The outputs of several projectors are tiled so that each projector provides a portion of the display. For example, the output of six projectors could be tiled to provide a two-by-three array of images, each image a portion of the total image. In the case of tiled displays, the color space of each projector must be matched, using color correction techniques.

Color correction is designed to correct for variations in the color spaces of two different imaging devices. Color correction changes the color values of the pixels in an image in a way such that what the eye sees is consistent.

A first type of color correction is the correction of the display system to the device used to capture the image. The optical system of each projector has its color filters adjusted and tuned to provide a match to other projectors.

A second type of color correction is electronic color correction. Electronic color correction adjusts the input signal to the display device to match the projectors. Each display to be matched must be measured to determine the color range or gamut over which it operates. From this data, (for each display), all displays can be corrected to match. This method is easier to implement than optical system adjustments because it requires only measurement of the systems for color correction to occur.

SUMMARY OF THE INVENTION

One aspect of the invention is a method of color matching images generated by multiple projectors of a tiled projection display system. It is assumed that each projector has a processing unit and that the system has some sort of main controller. The main controller could be one of the projector processing systems acting as a master controller, or it could be a separate processing system in communication with the projector processing systems via a bus. Each projector stores its own chromaticity data, this data representing at least the color gamut of images generated by that projector. It may also represent various aspects of luminance of the images. Each projector communicates this chromaticity data to the main controller. The main controller stores or computes a standard color gamut data, which represents a standard color gamut to which the projectors are to be matched. The main controller uses this standard color gamut data as well as the chromaticity data from each projector, to calculate color correction data for each projector. The main controller then communicates each projector's color correction data to that projector, which uses the color correction data to calculate pixel values.

The data stored at each projector and communicated to the main controller may also include data representing relative luminance of colors, such as might result from a color wheel or other color filter. The data may also represent luminance characteristics of a light source.

An advantage of the invention is that it avoids the need for tedious manual measurements and adjustments after the system is installed. The color and luminance data for each projector are stored with that projector and the color matching is automatically performed.

DETAILED DESCRIPTION OF THE INVENTION

Figure 1:
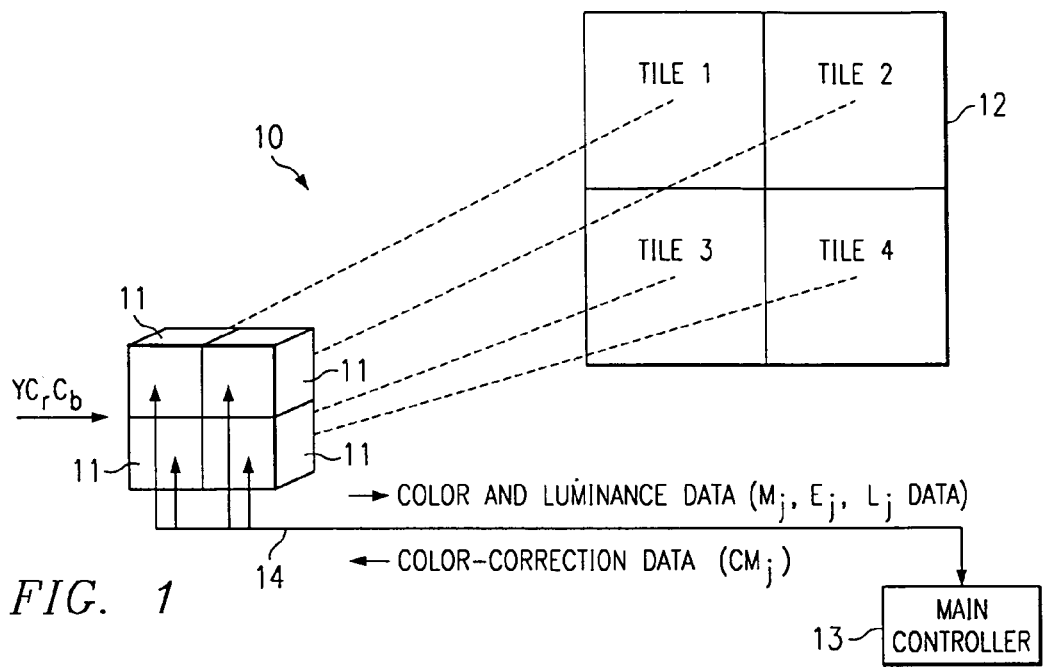
FIG. 1 illustrates the projectors of a tiled projection system and the tiled display.

FIG. 1 illustrates the projectors 11 and main controller 13 of a tiled projection system. These are the elements of the projection system relevant to the invention; a typical display system has various other electrical and mechanical features.

The images from four projectors 11 are projected onto a screen 12. Each of the projectors 11 contributes a tile of the screen 12. Thus a first projector generates tile 1, a second projector generates tile 2, etc. In the example of FIG. 1, the total image has four tiles.

As explained below, each projector 11 is a SLM (spatial light modulator) projector. In the example of this description, each projector 11 has a single SLM and uses a color wheel to provide color images. Further details of projectors 11 are set out below in connection with FIG. 3. In other embodiments, color could be provided by using two SLMs and a color wheel with a color splitting prism, or with three SLMs. Each SLM generates images of a different color and the images are optically combined to create a full color images.

Each projector 11 stores certain color and luminance data associated with that projector 11. This data includes at least three types of data. Projector chromaticity data, M, represents various aspects of color and luminance of the projector. As explained below, although this data may represent certain luminance aspects of the projector as well as its color, it is referred to herein as "chromaticity" data to distinguish it from other types of luminance data. Relative luminance data, E, represents the relative luminance of each color of the color wheel relative to a base rate at which the color wheel is running. Overall luminance data, L, represents characteristics of its illumination source. As explained below, this data is provided to main controller 13, which returns color correction data to each projector 11. For each projector 11, its color correction data, CM, represents the correction needed for that projector 11 to match its color to a standard color gamut. Each projector 11 then uses its color correction data to match its pixel data to that of the standard.

Main controller 13 performs various control functions required for generating the display, including calculation of the color correction data for each projector 11. A bus 14 carries data between projectors 11 and main controller 13.

Figure 2:
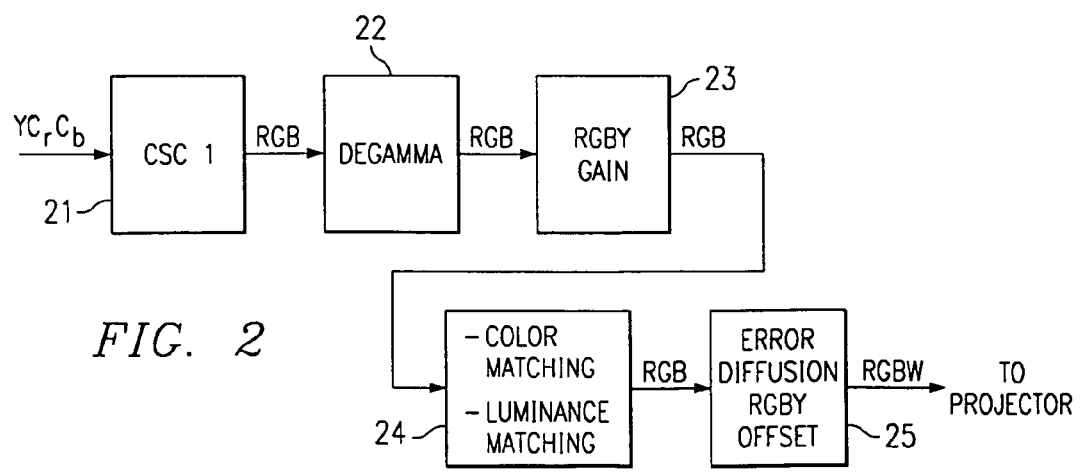
FIG. 2 illustrates a typical data flow of the image data within each projector.

FIG. 2 illustrates a typical data flow of the image data within a projector 11. In the example of this description, it is assumed that the input data is YCrCb data, such as that provided by a television signal. Each projector 11 receives the data appropriate for its tile of the total image. Although not shown in FIG. 1, it is assumed that the projection display system has some sort of receiver or data storage device for providing the input data.

A first color space conversion (CSC1) process 21 converts the YCrCb color space to an RGB (red, green, blue) color space. A degamma process 22 removes the gamma from the signal, such that the RGB signal is in linear space. In other embodiments, the input data might already be RGB data, with no need for process 21.

An RGBY gain process 23 applies gain to the signal. Process 23 is essentially for white processing, for projectors 11 whose color wheels have one or more white segments.

A second color space conversion process (CSC2) process 24 converts the gained RGB signal to a color-corrected space in accordance with the invention. In other words, process 24 results in pixel data that is color matched between projectors 11. Further details of process 24 are described below. Process 24 may also include luminance matching, which compensates for variances in the illumination systems of the projectors.

Process 25 applies error diffusion and RGBY offset. Error diffusion provides the correct number of bits per pixel for the display. The RGBY offset is an additional part of the white processing initiated in process 23. The resulting RGBW data is the input data for the projector's SLM.

Figure 3A:
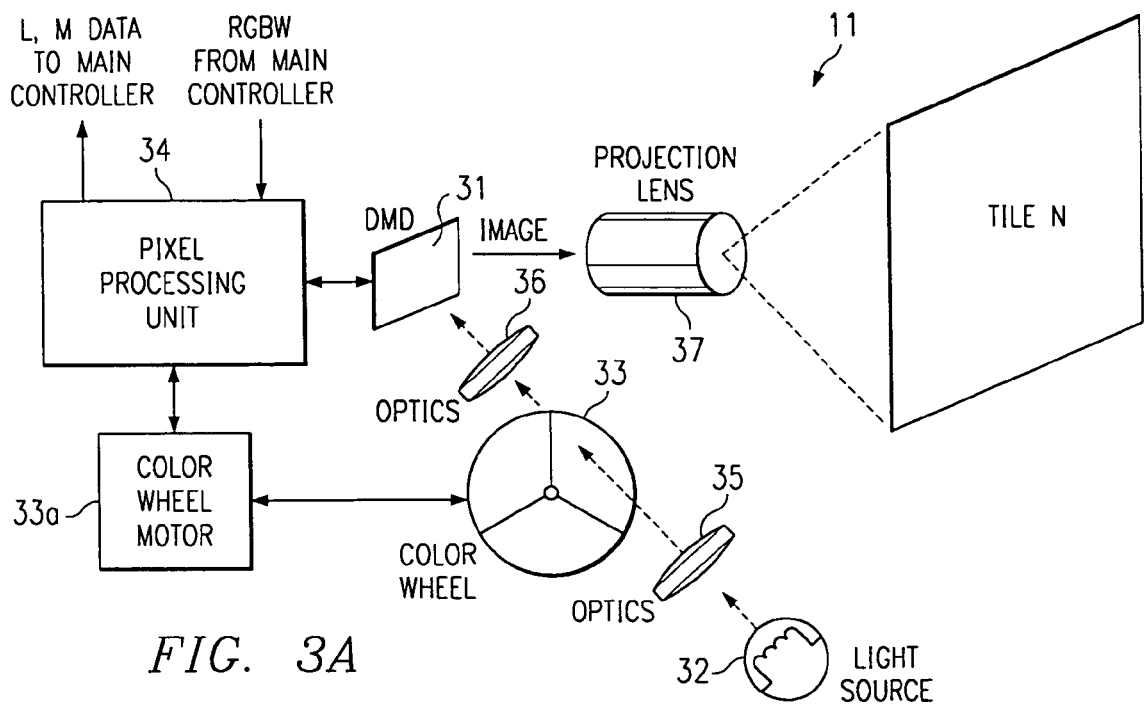
FIG. 3A illustrates the internal components of a projector having a color wheel and a single SLM.

FIG. 3A illustrates the internal components of each projector 11, where projector 11 uses a color wheel. In the example of this description, each projector 11 is a digital micromirror device (DMD™) projector. Each projector 11 has a single DMD 31, which is a type of SLM. The DMD 31 has an array of tiny mirrors, each of which are individually addressable with image data. Each mirror can be tilted to either an on or an off position. An image is generated by illuminating the DMD 31 with light from a white light source 32, switching the appropriate mirrors on or off and by modulating the time that the on mirrors are on. Images can be generated in such fast sequence, that the viewer perceives motion.

Each projector 11 has a color wheel 33 for adding color to the images. The color wheel 33 has red, green, blue, and white (RGBW) filter segments and spins in sequence with the images' corresponding RGBW data. Thus, for purposes of this example, a color wheel 33 having one or more white segments is assumed, but the same concepts could be applied to projectors without this feature.

Mirrors are turned on or off depending on how much of each color is needed per pixel. The projector 11 further comprises the color wheel motor 33a, pixel processing unit 34, various optics 35 and 36 for shaping the illumination to the DMD, and a projection lens 37. Processing unit 34 has one or more processors and associated memory appropriate for performing the processes of FIG. 2.

Figure 3B:
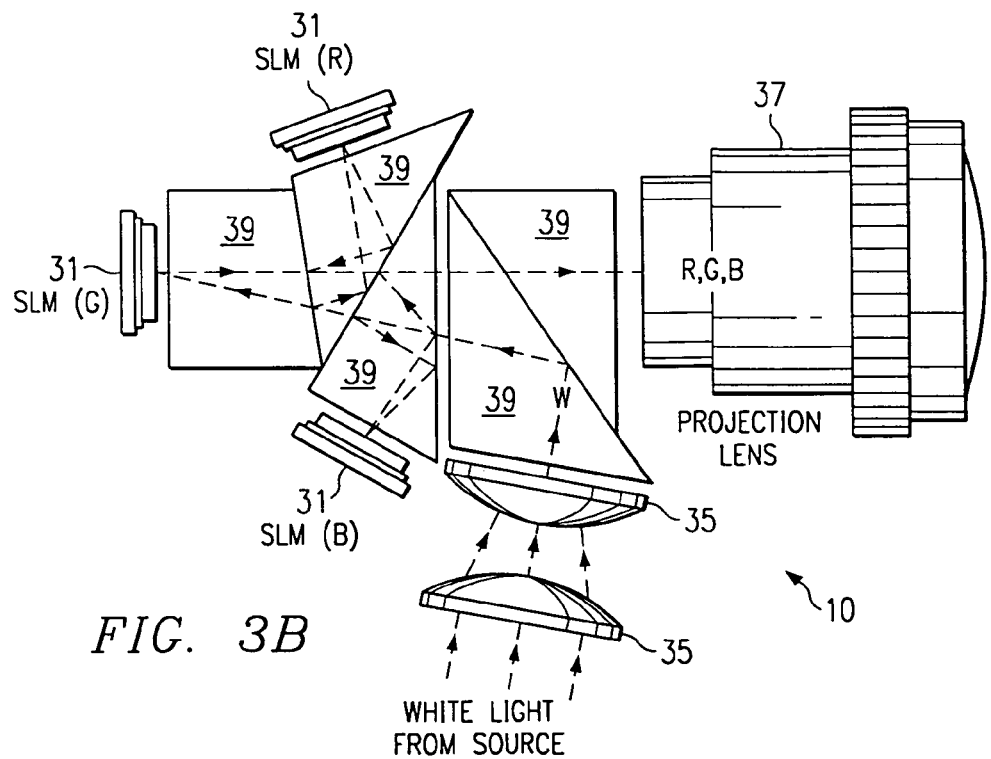
FIG. 3B illustrates the internal components of a projector having multiple SLMs.

FIG. 3B illustrates the internal components of projector 11, where projector 11 uses three SLMs (here DMDs 31) to generate color images. Each DMD 31 generates images of a different color. Optics 39, including a TIR (total internal reflection prism), are used to combine the images into projection lens 37.

Referring to FIGS. 1-3B, each projector 11 delivers its stored color and luminance data (its chromaticity data, M, its relative luminance data, E, and its luminance data, L) to main controller 13. For each projector 11, main controller 32 calculates color space correction data, CM, which it delivers to the processing unit 34 of that projector. The projector 11 uses this data during the color and luminance matching process 24.

Given a set of projectors 11 to be matched, the projectors 11 could be polled to get the color and luminance data of each. Additionally, controller 13 could communicate with customer interfaces and provide inputs for adjustment of the white point of the system. Or, it could provide outputs of the lamp status of each projector 11, using the luminance data collected from each projector. This could give the customer advanced warning to the need to replace lamp 32 prior to lamp failure.

Main controller 13 could be a DSP, a microcontroller, or an external computer such as a PC, or workstation. It could be placed within a bus structure 14, which could communicate with each projector 11, polling for the needed color and luminance data and then returning the color correction data. Alternatively, one of the projectors 11 could have a master processing system that performs the role of main controller 13.

Calculation of Color Correction Data

Figure 4:
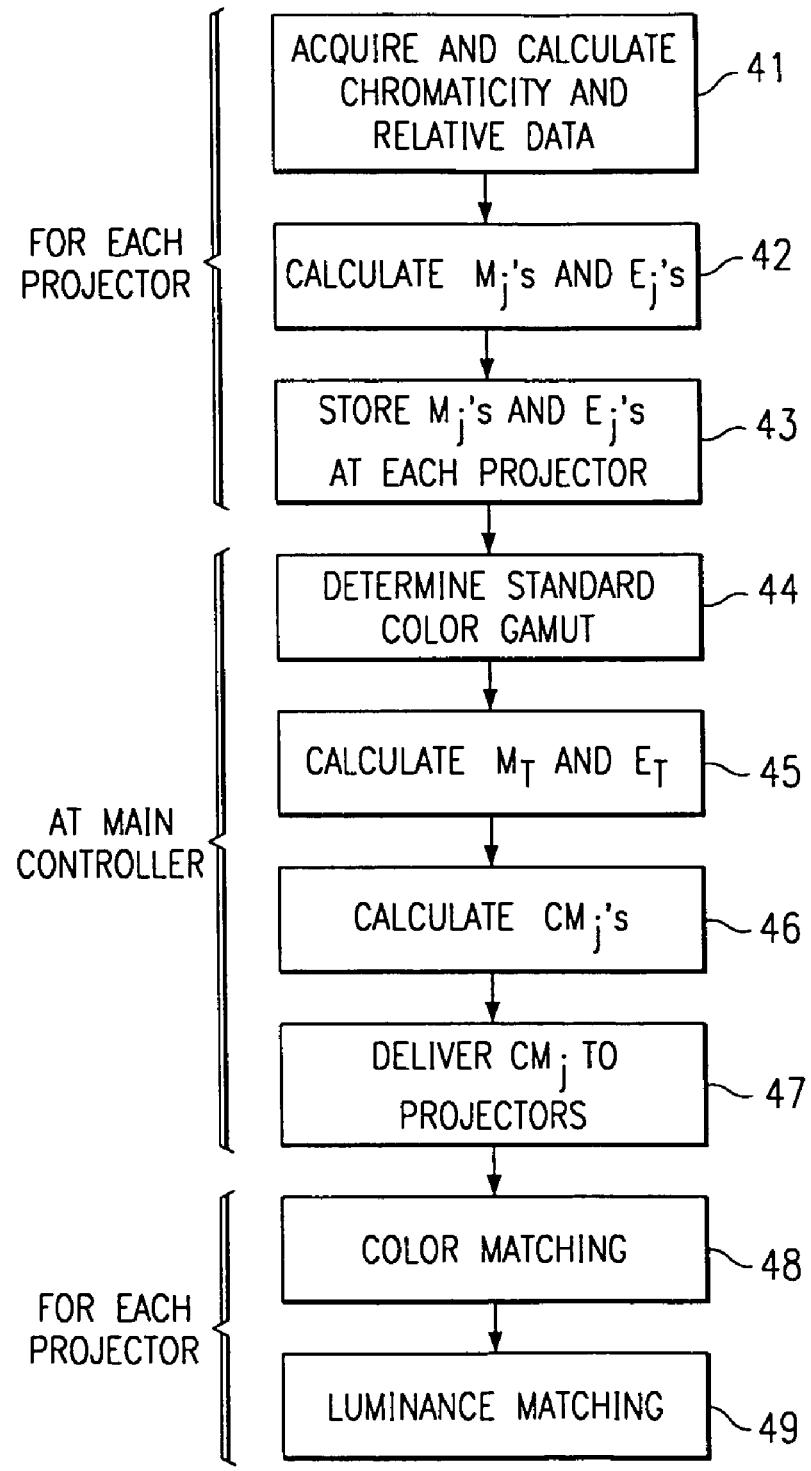
FIG. 4 illustrates how the color correction matrix for each projector is calculated and then used for the color matching process of FIG. 2.

FIG. 4 illustrates how the color correction data, CM, is calculated and used. In the example of this description, the chromaticity data and the relative luminance data are calculated in matrix form, designated as the matrices M and E, respectively. The color correction data is returned to the projectors in matrix form, designated as $CM_j$, for each projector 11.

As illustrated, Steps 41-43 are performed for each projector 11, resulting in the stored M and E data for each projector 11. Steps 44-47 are performed by main controller 13, using the M and E data to calculate $CM_j$ for each projector 11. Step 48 is the actual correction of the RGBW data at each projector 11, using the $CM_j$ data from the main controller 13.

Step 41 involves measuring chromaticity and relative luminances for each projector 11. For each projector 11, the following chromaticity measurements are obtained, using conventional measurement equipment for measuring chromaticity (x, Y, Z) values off the screen:

$X_R, Y_R, Z_R$ $X_G, Y_G, Z_G$ $X_B, Y_B, Z_B$ $X_{WS}, Y_{WS}, Z_{WS}$ where the subscript WS indicates white. Luminance measurements are also acquired as follows:

$Y'_{RGB}$ $Y'_{WS}$

The following chromaticity terms are defined:

$X_{RGB} = X_R + X_G + X_B$ $Y_{RGB} = Y_R + Y_G + Y_B$ $Z_{RGB} = Z_R + Z_G + Z_B$

In the example of this description, the relative luminance data, E, is based on effective light times (ELTs) of color wheel 33 at a defined standard rate, such as 60 cycles per second. In some systems, discrepancies between the ELTs at various rates may be insignificant and the measurements and calculations involving the E data could be omitted. In other embodiments, such as those using multiple SLMs to generate color images, the relative luminances could be measured for the images generated by the different SLMs.

The ELT's from a standard rate of color wheel 33 are expressed as:

$$ELT_R^S, ELT_G^S, ELT_B^S, ELT_{WS}^S$$

The chromaticity measurements can be adjusted for additional wheel rates:

$$X_\phi^N = X_\phi \cdot \frac{ELT_\phi^N}{ELT_\phi^S}$$

$$Y_\phi^N = Y_\phi \cdot \frac{ELT_\phi^N}{ELT_\phi^S}$$

$$Z_\phi^N = Z_\phi \cdot \frac{ELT_\phi^N}{ELT_\phi^S},$$

where $\phi$=R,G,B,WS; $ELT_{100}^S$ is the standard wheel rate ELT for a given color $\phi$; $ELT_\phi^N$ is the ELT for wheel rate N for a given color $\phi$; and $X_\phi^N, Y_\phi^N, Z_\phi^N$ are the new adjusted measurement for the given wheel rate N.

The above measurements may also be used for various calibration adjustments for the projector 11.

In Step 42, the above measurements are used to calculate a chromaticity matrix, M, and a relative luminance matrix, E, for each projector 11. First, the chromaticity and luminance data is used to calculate two parameters, $\alpha$ and $\beta$, and to compute white segment colorimetry.

$$\alpha = \frac{Y'_{RGB} \cdot Y_{WS}}{Y'_{WS} \cdot Y_{RGB}} \quad \beta = \frac{Y'_{WS}}{Y'_{RGB}}$$

$$X''_{WS} = \alpha \cdot X_{WS} \quad Y''_{WS} = \alpha \cdot Y_{WS} \quad Z''_{WS} = \alpha \cdot Z_{WS}$$

The chromaticity, luminance, and white segment data is then used to form matrix A as follows:

$$S_{RGB} = X_{RGB} + Y_{RGB} + Z_{RGB}$$

$$S_G = X_G + Y_G + Z_G$$

$$S_{WS} = X''_{WS} + Y''_{WS} + Z''_{WS}$$

$$S_B = X_B + Y_B + Z_B$$

$$A = \begin{bmatrix} \frac{X_R}{S_R} & \frac{X_G}{S_G} & \frac{X_B}{S_B} \\ \frac{Y_R}{S_R} & \frac{Y_G}{S_G} & \frac{Y_B}{S_B} \\ \frac{Z_R}{S_R} & \frac{Z_G}{S_G} & \frac{Z_B}{S_B} \end{bmatrix}$$

The inverse of A is calculated as:

$$\text{Define: } A = \begin{bmatrix} a & b & c \\ d & e & f \\ g & h & i \end{bmatrix}$$

Then $$A^{-1} = Dt \cdot \begin{bmatrix} e \cdot i - f \cdot h & c \cdot h - b \cdot i & b \cdot f - c \cdot e \\ f \cdot g - d \cdot i & a \cdot i - c \cdot g & c \cdot d - a \cdot f \\ d \cdot h - e \cdot g & b \cdot g - a \cdot h & a \cdot e - b \cdot d \end{bmatrix}$$

$$Dt = \frac{1}{(a \cdot e \cdot i - a \cdot f \cdot h - d \cdot b \cdot i + d \cdot c \cdot h + g \cdot b \cdot f - g \cdot c \cdot e)}$$

Normalized white points are calculated as:

$$W_x = X_{RGB}/Y_{RGB} \quad WS_x = X''_{WS}/Y''_{WS}$$

$$W_y = 1 \quad WS_y = 1$$

$$W_z = Z_{RGB}/Y_{RGB} \quad WS_z = Z''_{WS}/Y''_{WS}$$

$$\text{Define: } A^{-1} = \begin{bmatrix} a & b & c \\ d & e & f \\ g & h & i \end{bmatrix}$$

$$K_R = W_X \cdot a + b + W_z \cdot c$$

$$K_G = W_X \cdot d + e + W_z \cdot f$$

$$K_B = W_X \cdot g + h + W_z \cdot i$$

The chromaticity matrix, M, for each projector 11, is calculated as:

$$M = \begin{bmatrix} a & b & c & j \\ d & e & f & k \\ g & h & i & l \end{bmatrix},$$

where the letters a–l are placeholders and not the same as in the A matrix above. Values for each of these placeholders are calculated as follows:

$$F_R = K_R/(S_R \cdot ELT_R)$$

$$F_G = K_G/(S_G \cdot ELT_G)$$

$$F_B = K_B/(S_B \cdot ELT_B)$$

$$F_{WS} = Y''_{WS}/Y'_{RGB}$$

$$a = F_R \cdot X_R \quad b = F_G \cdot X_G \quad c = F_B \cdot X_B \quad j = F_{WS} \cdot \frac{X''_{WS}}{Y''_{WS}}$$

$$d = F_R \cdot Y_R \; e = F_G \cdot X_G \; f = F_B \cdot Y_B \; k = F_{WS}$$

$$g = F_R \cdot Z_R \; h = F_G \cdot X_G \; i = F_B \cdot Z_B$$

$$l = F_{WS} \cdot \frac{Z''_{WS}}{Y''_{WS}}$$

A relative luminance matrix, E, can be derived for each projector 11 from its ELT data as follows:

$$E_j = \begin{bmatrix} ELT_R^N & 0 & 0 \\ 0 & ELT_G^N & 0 \\ 0 & 0 & ELT_B^N \end{bmatrix},$$

where N is a given color wheel rate.

In Step 43, the color and luminance data for each projector 11 is stored in memory of its processing unit 34. This data includes the above-described matrices M and E, which are to be subsequently downloaded to main controller 13. Alternatively, data used to derive these matrices may be stored, then downloaded to main controller 13, which calculates the matrices. In some configurations of projectors 11, the color wheel 33 has an associated EPROM, where this data may be stored. Each projector 11 now has its own colorimetry stored in its memory.

Step 44 is to compute a standard color gamut, which will be used as the standard to which all projectors 11 are matched. This can be accomplished by finding the largest color gamut triangle that is contained within the color gamut of all the projectors 11. This color gamut can be found by pairing two projectors, and finding the largest color gamut which is contained within their color gamut. This new color gamut is then paired with all other projectors, and a new gamut established from each pairing.

Figure 5:
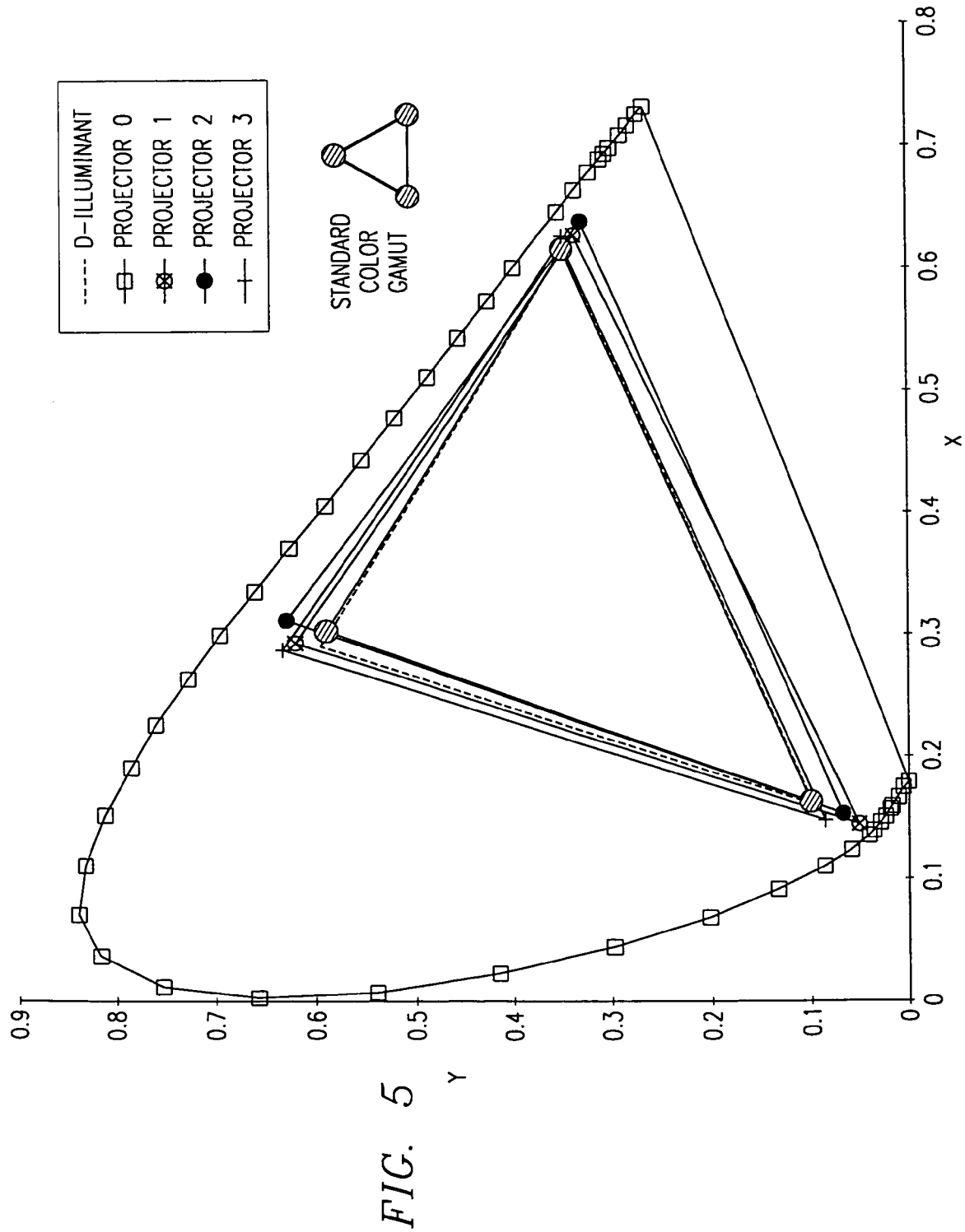
FIG. 5 illustrates how a standard color gamut is derived from the color gamuts of the projectors.

FIG. 5 illustrates the process of determining the standard color gamut. As shown, the standard gamut is the largest color gamut completely contained within four projector gamuts.

Referring again to FIG. 4, in Step 45, the standard color gamut is used to determine a standard color matrix, $M_T$. Known techniques may be used to calculate the matrix from the gamut. These techniques generally involve selecting three points from the standard gamut and a white point. The white point can be defined as either the average white point of all projectors 11 or as an arbitrary white point.

Step 46 is calculating a color correction matrix, $CM_j$, for each projector 11. Given the chromaticity matrix, $M_j$, for each projector:

$$M_j = \begin{bmatrix} a & b & c & j \\ d & e & f & k \\ g & h & i & l \end{bmatrix},$$

the RGB portion of the matrix is:

$$\text{Define: } C = \begin{bmatrix} a & b & c \\ d & e & f \\ g & h & i \end{bmatrix}$$

$$C^{-1} = Dt \cdot \begin{bmatrix} e \cdot i - f \cdot h & c \cdot h - b \cdot i & b \cdot f - c \cdot e \\ f \cdot g - d \cdot i & a \cdot i - c \cdot g & c \cdot d - a \cdot f \\ d \cdot h - e \cdot g & b \cdot g - a \cdot h & a \cdot e - b \cdot d \end{bmatrix}$$

$$Dt = \frac{1}{(a \cdot e \cdot i - a \cdot f \cdot h - d \cdot b \cdot i + d \cdot c \cdot h + g \cdot b \cdot f - g \cdot c \cdot e)}$$

Given the relative luminance matrix, E, for each projector 11, then:

$$E_j^{-1} = \begin{bmatrix} 1/ELT_R^N & 0 & 0 \\ 0 & 1/ELT_G^N & 0 \\ 0 & 0 & 1/ELT_B^N \end{bmatrix}$$

The color correction data, CM, for each projector j, may be expressed in matrix form as:

$$CM_j = E_j^{-1} \cdot C_j^{-1} \cdot C_T E_T$$

, where $E_T$ is a standard relative luminance matrix derived from the standard wheel rates described above in connection with Step 41.

Referring again to FIG. 2, the next issue is the luminance levels of the projectors 11. As part of process 24, following color correction, the luminance level of each projector 11 is matched. This can be accomplished using either a direct measurement of each projector 11, or through use of a sensor internal to each projector 11. This internal sensor could be a sensor placed in a dump light path or other suitable location in which the light is proportional to the lamp output. This sensor could be calibrated in the factory to read a number related to the luminance level of the projector 11. The luminance data, L, of each projector 11 can be used to adjust the gain levels of the CM matrix.

Additionally, information about the screen color performances could be input into main controller 13. Color correction for screen colorimetric performance could be performed. This could include correction for reduced blue saturation, or general white point movement due to the screen.

Referring again to FIG. 3, the color correction matrix, CM, for each projector 11 can now be downloaded into that projector 11. Each projector 11 uses this matrix to perform the color matching process 24 of FIG. 2. As a result, its images are color corrected into the gamut defined by $C_T \cdot E_T$.

As stated above, the relative luminances of some systems may not be a significant factor in color discrepancies between projectors 11. In this case, the color correction matrix could be more simply calculated as:

$$CM_j = C_j^{-1} \cdot C_T$$

In still other embodiments, the relative luminance data could be incorporated into the C matrix.

The above is but one example of a color correction matrix. U.S. Pat. No. 6,594,387, issued 15 Jul. 2003, entitled "Enhanced Color Correction", and incorporated by reference herein, describes an alternative color correction matrix. As in the present invention, the color correction matrix is a 3×3 matrix, but is derived from a 3×7 matrix that includes secondary color values as well as primary color values. Using the enhanced color correction technique provides additional flexibility in the color correction of multiple display systems. This includes larger color gamuts and brighter displays.

The above-described techniques are not limited to display systems using the digital micromirror device (DMD). They are also applicable to other display technologies, such as LCD, plasma, CRTs, FEDs, laser illumination systems, or LED illumination systems. The concepts are applicable to both rear and front projection display technologies.

Other Embodiments

Although the present invention has been described in detail, it should be understood that various changes, substitutions, and alterations can be made hereto without departing from the spirit and scope of the invention as defined by the appended claims.

What is claimed is:

1. A method of color matching images generated by multiple projectors of a tiled projection display system, comprising the steps of:
    providing at least two projectors, each having chromaticity data representing a color gamut of that projector stored therein, and having luminance data representing the relative luminance of colors generated by that projector stored therein;
    communicating each projector's stored chromaticity and luminance data to a main controller;
    determining a standard color gamut achievable by each said projector;
    calculating color correction data for each projector, based on that projector's stored chromaticity data, luminance data, and on said standard color gamut; and
    calculating image pixel values based on input image data and said color correction data;
    wherein said determining and calculating color correction data steps are performed by at least one component selected from the group consisting of:
        a processing system in data communication with each projector, and
        at least one projector functioning at least partially as the main controller.

2. The method of claim 1, wherein each of said projectors include spatial light modulators at which light is directed from a light source through a rotating color wheel;
    and wherein said stored luminance data for a projector represents effective light times of each color of the color wheel for that projector relative to a base color wheel rate.

3. The method of claim 1, further comprising the step of adjusting the gain of the color correction data based on the stored luminance data.

4. The method of claim 1, wherein the communicating step comprises communicating each projector's stored chromaticity data in the form of a transfer function matrix.

5. The method of claim 1, further comprising:
    calculating chromaticity data for each projector from primary and white color values.

6. The method of claim 1, wherein said determining and calculating color correction data steps are performed by one of said projectors.

7. The method of claim 1, further comprising:
    generating images at each projector, from the calculated image pixel values, and using a spatial light modulator.

8. The method of claim 1, wherein the calculating color correction data step calculates the color correction data from primary and secondary colors.

9. A display system comprising:
    at least two projectors, each said projector operable to generate a portion of an image, each projector comprising:
        a spatial light modulator, for generating its portion of the image responsive to pixel values for each of a plurality of color components;
        a memory, for storing chromaticity data and luminance data for that projector, the luminance data representing the relative luminance of the colors generated by the spatial light modulator responsive to the pixel values; and
    a main controller, coupled to each of the at least two projectors to receive the stored chromaticity and luminance data therefrom and to communicate corrected pixel values thereto, the main controller comprising circuitry for generating color correction data for each projector based on the received chromaticity and luminance data, and for communicating the color correction data for each projector to that projector;
    wherein each projector further comprises circuitry for calculating corrected pixel values based on said color correction data.

10. The display system of claim 9, wherein the spatial light modulator in at least one of said at least two projectors comprises:
    a digital micro mirror device;
    a light source; and
    a color wheel disposed between the light source and the digital micro-mirror device.

11. The display system of claim 10, wherein the luminance data of each of the projectors represents effective light times of colors of the color wheel in that projector relative to a base color wheel rate.

12. The display system of claim 9, wherein the color correction data is derived from primary and secondary colors.

* * * * *